United States Patent [19]

Kulhavy

[11] 3,837,182

[45] Sept. 24, 1974

[54] DRIVE LINE DAMPER

[75] Inventor: Joseph T. Kulhavy, Davenport, Iowa

[73] Assignee: J. I. Case Company, Racine, Wis.

[22] Filed: Aug. 20, 1973

[21] Appl. No.: 389,822

[52] U.S. Cl............................ 64/26, 64/1 V, 64/27, 74/574, 74/604
[51] Int. Cl................................................ F16d 3/80
[58] Field of Search.................. 64/26, 27, 1 R, 1 V; 74/604, 574

[56] References Cited
UNITED STATES PATENTS

| | | | |
|---|---|---|---|
| 1,815,639 | 7/1931 | Wilkin et al. | 64/26 |
| 1,872,763 | 8/1932 | Lee | 74/604 |
| 2,248,791 | 7/1941 | Taylor | 74/604 |
| 2,367,709 | 1/1945 | Duntor et al. | 74/574 |
| 3,296,887 | 1/1967 | Larsen | 74/574 |
| 3,421,343 | 1/1969 | Wiseman | 64/27 R |
| 3,528,265 | 9/1970 | Brinson | 64/26 |

Primary Examiner—Samuel Scott
Assistant Examiner—Randall Heald

[57] ABSTRACT

A damper system which connects a flywheel and drive shaft combines a continuous, closed hydraulic system with a mechanical spring arrangement to absorb and eliminate vibrational forces generated at low engine speeds. A force transmitting member in the form of a hub is connected to the drive shaft for rotation therewith and is biased by the combination hydraulic-spring damper to permit relative rotational movement. A centrifugally operated valve blocks the continuous, closed hydraulic system at full engine operation to lock the damper and thereby eliminate any relative movement between the flywheel and drive shaft.

16 Claims, 4 Drawing Figures

3,837,182

DRIVE LINE DAMPER

BACKGROUND OF INVENTION

Diesel engines which are directly coupled to gear boxes produce a characteristic gear rattle at no load idle conditions. This gear rattle is caused by the inherent operation of a combustion engine. During idle operation, the pistons decelerate during the compression stroke than accelerate during the power stroke, thus producing an irregular velocity in the crankshaft. However, further down the drive line the transmission is attempting to operate at constant velocity. A resulting fight between the crankshaft and transmission produces a backlash between the gear teeth, and the gear rattle is thereby created.

Previous attempts to eliminate this noise have involved introducing springs or friction elements into the drive line to allow for several degrees of movement between the drive and driven shafts. However, these devices have in general been inadequate because they were not durable enough to survive the torturous treatment of the backlash phenomenon. Further, these devices have also been undesirable because of their inability to transmit the maximum torque of the engine and any shock loading which might occur.

In a somewhat related art, Wiseman, U.S. Pat. No. 3,421,343, employs a device which is similar to that of the present invention for damping resonant vibrations occurring at high rotational speeds. However, not only is this prior art patent unconcerned with the problem of backlash and gear rattle, but it fails in several material respects to suggest the present invention. For example, the device of that patent does not provide a continuous, closed hydraulic system which acts in combination with the spring biasing arrangement to limit the relative rotational movement of a central force transmitting member.

SUMMARY OF INVENTION

The disclosed invention relates generally to damping systems connecting the crankshaft or flywheel of an engine with a driven output. More particularly, this invention relates to a damper system constructed to absorb and eliminate primarily those vibrational forces generated at low or idle engine speeds.

The primary object of this invention is to eliminate the characteristic gear rattle in diesel engines. Furthermore, it is an object to eliminate the inherent drawbacks and disadvantages of prior art attempts at solving this problem.

In the accomplishment of these objects, a damping system is connected between the flywheel and drive shaft of a drive line. The system includes a housing having an axis of rotation and an internal reservoir area. A pair of opposing radial bores extend outwardly from the reservoir area. A separate pair of parallel lateral bores extend longitudinally through the housing perpendicular to the axis of rotation to intersect a portion of the reservoir area. Double-ended pistons slidably mounted within each parallel lateral bore define paired hydraulic damping cylinders which include a mechanical spring damping element. A force transmitting member in the form of a splined hub is located within the reservoir area and includes radially extending levers which seat in slots formed in the double-ended pistons. The hub is biased by the double-ended pistons to assume a neutral position, but is capable of slight rotational movement relative to the other components of the damper system. A valve member is located within each of the radially extending bores and includes a centrifugally operated valve restrictor member which is radially arranged and normally biased open. The valve members define, in the outer portions of each radial bore, an outer valve chamber. Passageways interconnect each pair of diametrically opposed damping cylinders with one of the outer valve chambers to define with the reservoir area a closed hydraulic system.

During idle speeds and slow engine operation, the force transmitting member is capable of absorbing rotational vibrations due to its ability to rotate relative to the damper housing. This relative rotation is transmitted to the double-ended pistons which bias the hub levers. Any lateral movement by the pistons causes hydraulic fluid to be shifted or pumped through the continuous, closed hydraulic system to thereby dampen the rotational vibration. As the engine speed increases, the damper system rotates at a higher velocity, thereby creating a centrifugal force on the enclosed elements. Since the valve restrictor elements are free to move radially, they shift outwardly under the influence of the centrifugal force and eventually close the hydraulic passageways. Due to the inability of the hydraulic fluid to circulate after closure of the passageways, the damping pistons are locked into position and eliminate any relative movement between the central hub member and the remainder of the damping system. When the engine speed decreases, the reduction in centrifugal force will enable the restrictor elements to assume a position so that the fluid passageways will be open. This permits free movement of the hydraulic fluid, thereby rendering the damping cylinders operative to once again absorb undesirable vibrational forces.

DETAILED DESCRIPTION OF THE DRAWINGS

Figure 1:
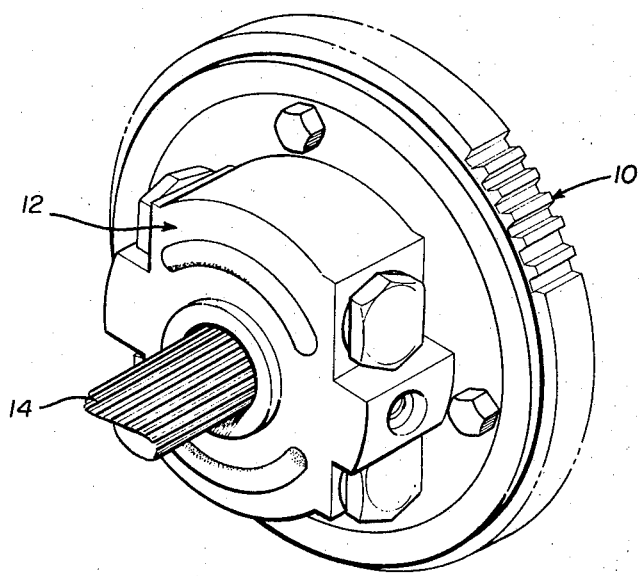
FIG. 1 is a perspective view of the damper housing connected between the engine flywheel and the drive shaft.

FIG. 1 illustrates generally a damper housing 12 being interconnected between a flywheel 10 and a drive shaft 14.

Figure 3:
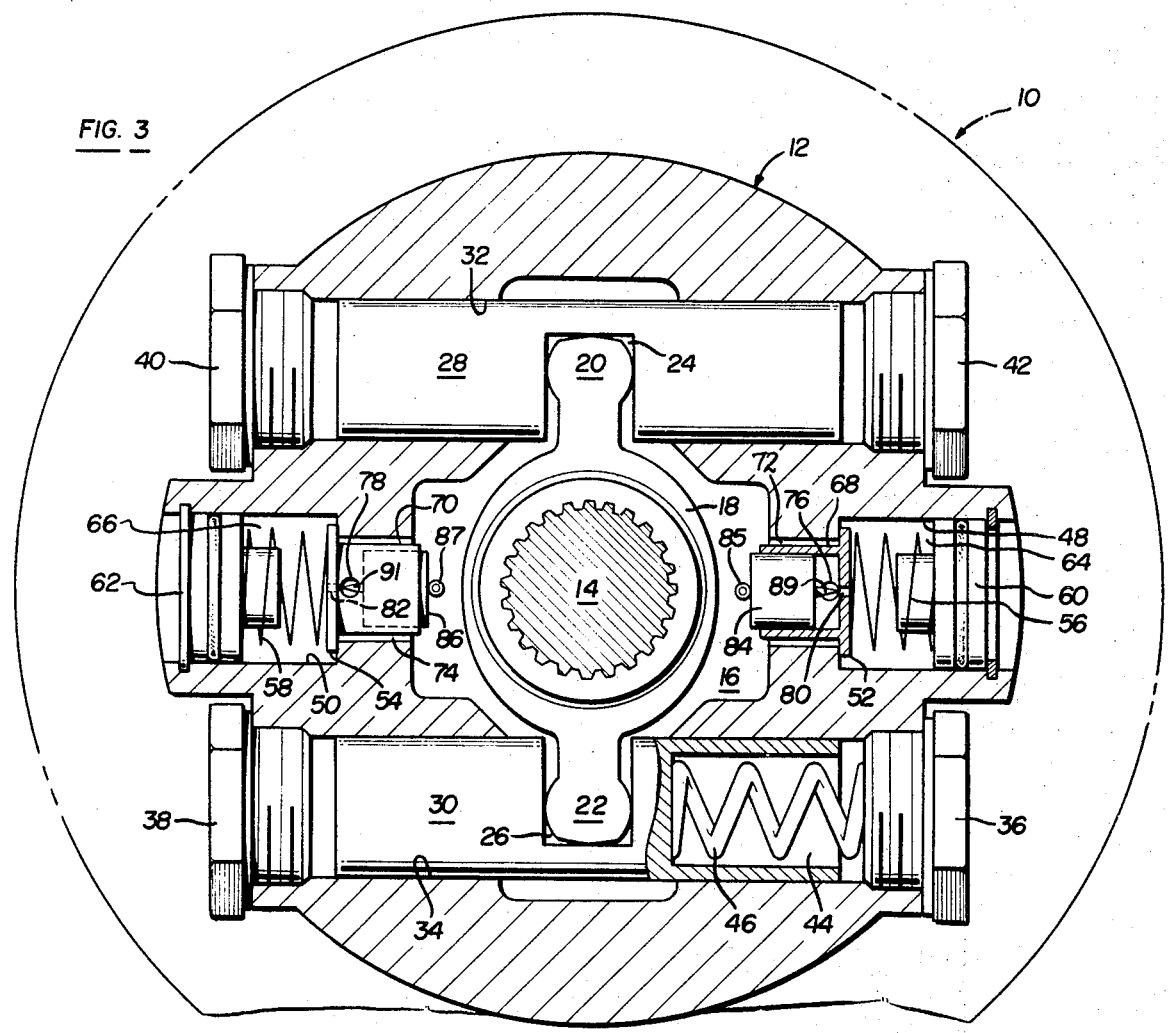
FIG. 3 is a sectional view through the damper housing illustrating the damper components.
Figure 4:
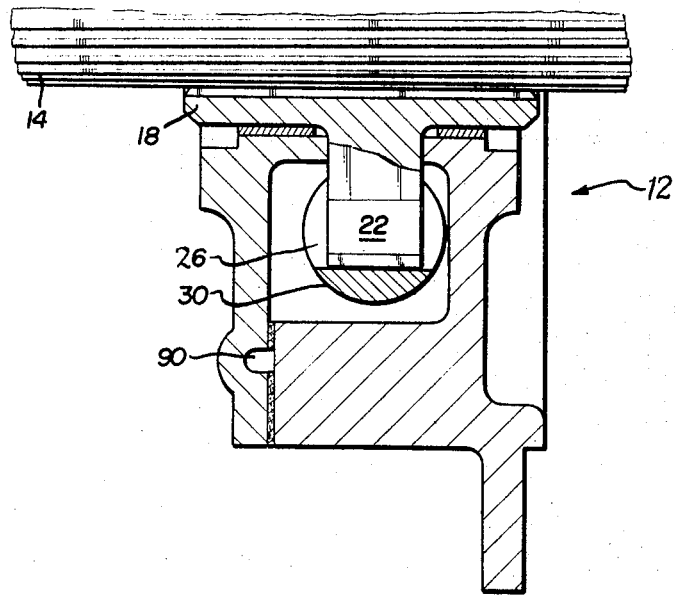
FIG. 4 is a partial sectional view parallel to the drive shaft illustrating a detail of the invention.

In FIGS. 3 and 4, it can be seen that drive shaft 14 passes through central reservoir region 16 and interconnects with output hub 18 by a splined connection. The output hub is mounted for relative rotational movement to absorb vibrational forces in a manner to be described.

Integral lever members 20, 22 extend radially outwardly from the central hub 18 to engage slots 24, 26 formed in double ended pistons 28, and 30, respectively, which slide freely within parallel lateral bores 32, 34. FIG. 4 particularly illustrates the interrelationship among the drive shaft, hub, lower lever member 22 and double-ended piston 30. End caps 36, 38, 40, and 42 close the ends of the lateral bores to define with the double-ended pistons four damping cylinders, 44, 44A, 44B, and 44C, shown in phantom in FIG. 2. Each damping cylinder forms a portion of the continuous, closed hydraulic system and also houses a compression damping spring which is of a size to damp out low frequency oscillations. It can be seen that any relative rotational movement of the central force transmitting hub 18 is converted into axial movement of the double ended pistons 28, 30. Such axial movement is limited by the ends of the double-ended pistons abutting against the end caps.

Radially extending bores 48, 50 define a separate portion of the continuous, closed hydraulic system. Seated on ledge portions within the radial bores are disc type valves 52, 54 which are securely maintained in place by compression springs 56 and 58, respectively, or other conventional means. The compression springs abut against outer cap members 60 and 62, respectively, which with the disc type valve elements 52, 54 define outer valve chambers 64, 66. The disc type valve members include tubular guide portions 68, 70 which with the inner portions of the radial bore define annular passageways 72 and 74, respectively. These annular passageways communicate directly with the central reservoir region and indirectly with the outer valve chambers by way of ports 76 and 78, respectively, provided in the tubular guides and valve orifices 80 and 82, respectively, in the flange portion of the disc valves.

Slidably positioned within the tubular guides are valve restrictor members 84, 86 whose inward movement is limited by abutment members 85 and 87, respectively. The outer faces of the valve restrictors include needle restrictor protrusions 89, 91 which engage and close the valve orifices when the valve restrictors move outwardly under the influence of centrifugal force. At idle speeds, the valve restrictor member is forced away from the orifice due to the circulating hydraulic fluid as will be described. However, if desired, a spring element may be positioned between the restrictor and disc valve to regulate the restrictor movement. In either event, the mass of the restrictor element is designed to effect complete closure of the valve orifice at full operational speed of the engine or at any predetermined speed depending upon the mass of the restrictor members and the friction between the members and the cylinders. Closure of the valve orifice results in the continuous, closed hydraulic system being locked, thereby preventing any relative rotational movement between the hub element 18 and the remainder of the damping system.

Figure 2:
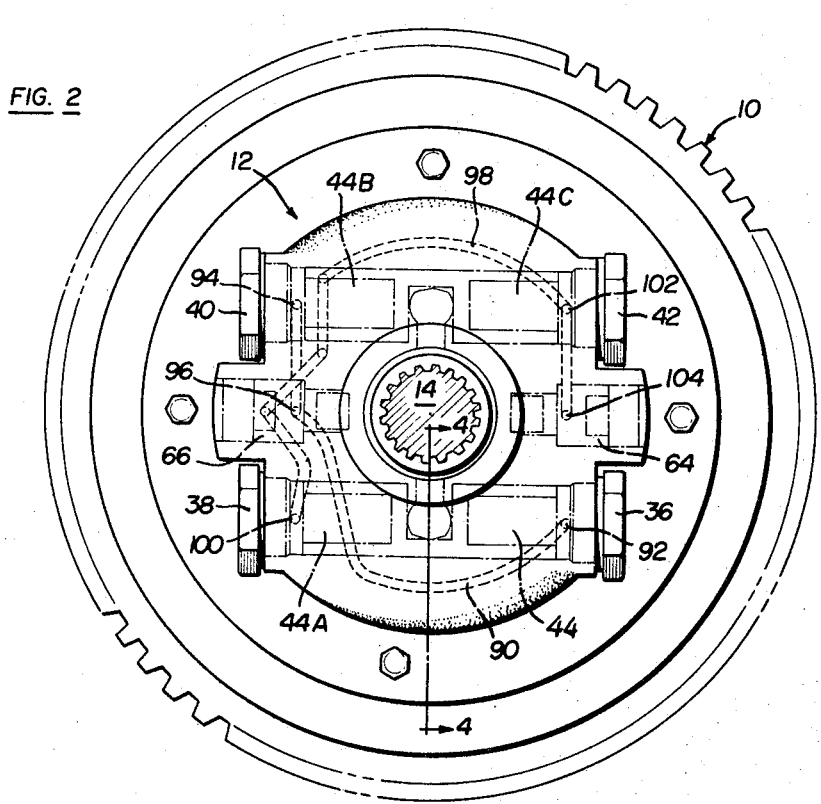
FIG. 2 is an elevational view of the housing illustrating in phantom the hydraulic passageways and damping cylinders.

The remainder of the continuous, closed hydraulic system is illustrated in FIG. 2, which will be described in relation to the orientation shown. A first hydraulic passageway 90 having outlet ports 92, 94 and 96 interconnects the lower right-hand damping cylinder 44, the upper left-hand damping cylinder 44B and outer valve chamber 66. A second hydraulic passageway 98 having outlet ports 100, 102 and 104 interconnects the other two diametrically opposed damping cylinders, 44A and 44C, with outer valve chamber 64. The illustrated circuitous path of passageway 98 is necessary to avoid intersecting, and therefore communicating with, any other portions of the closed hydraulic system, particularly valve chamber 66, passageway 90, and damping cylinder 44B. It will be noted that the interconnected damping cylinders experience the same reaction from the axial movement of the double-ended pistons. That is, if piston 28 moves to the left, piston 30 moves to the right, thereby diminishing the volume of damping cylinder 44 and its partner, while increasing the volume of the other two interconnected damping cylinders. Such an arrangement causes a combined output of hydraulic fluid into a single passageway and its associated outer valve chamber, to thereby establish a greater damping potential.

In employing the invention disclosed herein a damper housing 12 will be interposed between two drive line elements, such as flywheel 10 and drive shaft 14 shown in FIG. 1, for the purposes of allowing relative rotational movement between such elements at desired rates of rotation. In operation, when the engine is idling or otherwise operating at no-load conditions, valve restrictor members 84, 86 and their associated needle restrictor protrusion elements 89 and 91 will be automatically positioned substantially as shown in FIG. 3. As a result, hydraulic fluid is free to be circulated throughout the continuous, closed hydraulic system to dampen vibrational forces in the manner described below. When a vibrational force is experienced by the flywheel 10 and attached damper housing 12, central force transmitting member 18, which is splined to drive shaft 14 for rotation therewith, will act to absorb or dampen the vibrational force because it is mounted within the housing for relative rotational movement. For example, if a sudden vibrational force causes flywheel 10 and damper housing 12 to move sharply in a clockwise direction, central force transmitting member 18 will experience a counter clockwise movement relative thereto. Radial extensions 20 and 22 on member 18 will in turn cause double-ended piston 28 to move to the left and double-ended piston 30 to the right, as viewed in FIG. 3. Hydraulic fluid within damping cylinders 44 and 44B will therefore be forced into the first hydraulic passageway 90, which can be seen in FIG. 2. This will in turn cause other hydraulic fluid to be circulated sequentially through outer valve chamber 66, annular passageway 74, central reservoir region 16, annular passageway 72, outer valve chamber 64, second hydraulic passageway 98, and into either damping chamber 44A or 44C. If the flywheel and damper housing were to experience a vibrational force in the counter clockwise direction, the movement of the hub and the pumping action of the hydraulic fluid throughout the continuous, closed hydraulic system would be in the opposite direction of that just described. This hydraulic pumping action, along with the action of the compression spring elements contained within each damping cylinder, tends to dampen any such vibrational force so that it will not be transmitted to drive shaft 14. As the speed of the engine is increased, flywheel 10 and connected damper housing 12 will resultingly rotate at higher rates of speed, thereby producing centrifugal force on all the elements associated therewith. Since valve restrictor members 84, 86 and their associated needle protrusion members 89, 91 are free to move within the tubular guide portion of the disc valves, such elements will be forced outwardly by the centrifugal force against the pressure of hydraulic fluid circulating through orifices 80 and 82. When the engine reaches full operational speed, needle restrictor protrusion members 89 and 91 will engage orifices 80 and 82 to thereby close the continuous hydraulic passageway system. As a result, hydraulic fluid is prevented from being pumped out of any of the damping chambers, and accordingly the force transmitting member 18 and the drive shaft 14 to which it is rotationally connected are locked to damper housing 12 and flywheel 10. This is desirable, since gear rattle does not occur at higher rates of rotational speed, so that the full force developed within the engine at such speeds can be transmitted completely down the drive line without any losses occassioned by relative rotational movement between any of the parts. When the rotational speed of housing 12 once again decreases, needle restrictor protrusion members 89 and 91 will disengage orifices 80 and 82, respectively, to allow hydraulic fluid flow within the hydraulic passageway system for purposes of damping low-speed vibrational forces.

It will be appreciated that the present invention can be employed in various drive lines to absorb vibrational forces occuring at any speed. The particular arrangements illustrated and described are merely for exemplary purposes and are not meant to be limiting in any way.

I claim:

1. A damping apparatus interconnecting a drive member and a driven member for rotational movement, said apparatus comprising:
    a housing connected to said drive member for rotation therewith;
    at least two damping cylinders within the housing being hydraulically interconnected by a fluid passageway system, said passageway system permitting hydraulic fluid to flow from one damping cylinder to the other;
    a force transmitting member connected to said driven member for rotation therewith and having at least one radial lever extension;
    a piston slidably positioned within each of said damping cylinders and biased so as to bear against opposed sides of said radial extension; and
    valve means within said housing controlling the flow of hydraulic fluid through said fluid passageway, said valve means including means normally biasing said valve means open to permit a controlled fluid flow through said passageway at rotational speeds less than a predetermined speed, the opening of said valve means being directly proportional to the rotational speed of said drive member, to (1) close said fluid passage at rotational speeds greater than said predetermined speed to positively rotationally interlock said drive and driven members, (2) open said fluid passage, proportional to the speed of said drive member, permitting relative rotational displacement of said drive and driven members and (3) prevent transmission of intermittent and vibrational forces at relatively low rotational speeds.

2. The apparatus defined in claim 1 characterized in that said force transmitting member is positioned within a central fluid reservoir, said reservoir communicating with and forming a portion of said fluid passageway system.

3. The apparatus defined in claim 2, further including two lateral bores, and a piston in each bore comprising two spaced, axially aligned piston members adapted to move in unison within said bores, defining four damping cylinders hydraulically interconnected by said fluid passageway system.

4. The apparatus defined in claim 3, characterized in that said force transmitting member includes at least two radial lever extensions, each extension biased by a pair of said opposed spaced, axially aligned piston members.

5. The apparatus defined in claim 3, including a compression spring located within each damping cylinder, said springs resiliently biasing its associated piston member in a direction toward said side of said radial extension against which said piston bears, whereby said force transmitting member is resiliently biased by said compression springs for damping low frequency oscillations.

6. The apparatus defined by claim 4, wherein said passageway system further includes a first passageway interconnecting a cylinder of one lateral bore with a corresponding cylinder of the other lateral bore, and a second passageway interconnecting the other of the two cylinders, relative rotation of said force transmitting member pumping hydraulic fluid out of two of the interconnected damping cylinders, through the fluid passageway system and into the other of the two interconnected damping cylinders.

7. The apparatus defined by claim 6 characterized in that said housing has two radial bores extending outwardly from said central fluid reservoir, one of said passageways directly connected to one of said radial bores, and the other of said passageways connected directly to the other of said radial bores, whereby the central fluid reservoir region hydraulically connects with each pair of interconnected damping cylinders via one of said radial bores and its associated passageway.

8. The apparatus defined by claim 7, characterized in that said valve means includes a valve restrictor member slidably positioned within each of said radial bores closing said hydraulic passageway system at rotational speeds greater than said predetermined speed.

9. A damping apparatus interconnecting a drive member and a driven member of a drive line to eliminate vibrational forces occurring at no load operating conditions, comprising:
    a housing connected to said drive member for rotation therewith
    a force transmitting member positioned within said housing for relative rotational movement with respect thereto and connected to said driven member for rotation therewith, said force transmitting member having oppositely directed radial lever extensions;
    two sets of opposed, cup-shaped pistons bearing against opposed sides of said radial extensions to resiliently bias said force transmitting member, said sets of pistons slidably positioned within parallel lateral bores to define two sets of hydraulic damping cylinders;
    a central reservoir region, in which said force transmitting member is located, having opposed, radially extending bores defining outer valve chambers;

a first hydraulic passageway interconnecting a hydraulic damping cylinder of one such set, a diametrically opposed hydraulic cylinder of the other such set, and one of the outer valve chambers;
    a second hydraulic passageway interconnecting the other of the two diametrically opposed damping cylinders and the other of the outer valve chambers, whereby a hydraulic passageway system is formed having a central reservoir region and two hydraulic branches each formed by a radially extending bore, a hydraulic passageway and two hydraulic damping cylinders; and centrifugally operated valve means positioned in each radial bore adapted to be normally biased open and to be selectively closed at a predetermined rotational speed of the damper housing, said valve means (1) permitting fluid flow within said hydraulic passageway system at low rotational speeds and (2) preventing fluid flow within said hydraulic passageway system at rotational speeds greater than said predetermined speed to positively rotationally interlock said drive and driven members.

10. A damping apparatus interconnecting a drive member and a driven member of a drive line to eliminate transmission of vibrational forces, comprising:

a housing connected to said drive member for rotation therewith;

a force transmitting member positioned within said housing for relative rotational movement with respect thereto and connected to said driven member for rotation therewith, said force transmitting member having at least one radial lever extension;

a set of opposed, cup-shaped pistons bearing against opposed sides of said radial extension to resiliently bias said force transmitting member, said set of pistons slidably positioned within a bore to define a set of hydraulic damping cylinders;

a hydraulic passageway system interconnecting said set of damping cylinders to permit fluid flow therebetween in response to movement of said pistons by rotational movement of said force transmitting member relative to said housing; and centrifugally operated valve means within said hydraulic passageway system adapted to be normally biased open and to be selectively closed at a predetermined rotational speed of the damper housing, said valve means permitting fluid circulation through the hydraulic passageway system at low rotational speeds to allow relative rotational movement between said force transmitting member and said housing, and preventing fluid circulation at high rotational speeds to rotationally lock the force transmitting member to the housing.

11. The apparatus defined in claim 10, characterized in that said force transmitting member includes two oppositely directed radial lever extensions, each such extension being resiliently biased by a set of said opposed, cup-shaped pistons.

12. The apparatus defined in claim 11 characterized in that said sets of pistons are, respectively, slidably positioned within a set of lateral bores, defining two sets of hydraulic damping cylinders.

13. The apparatus defined in claim 10 characterized in that said hydraulic passageway system includes a central reservoir region in which said force transmitting member is located.

14. The apparatus defined in claim 13 characterized in that said hydraulic passageway system further includes a bore extending radially outwardly from said central reservoir region, said centrifugally operated valve means being positioned within said radial bore.

15. The apparatus defined in claim 14 characterized in that said centrifugally operated valve means includes a radially oriented piston (1) biased radially outwardly by centrifugal force developed by rotation of said damper housing and (2) closing said hydraulic passageway system at said predetermined rotational speed due to radial movement effected by centrifugal force.

16. The apparatus defined in claim 15 characterized in that said hydraulic passageway system further includes two opposed radial bores housing similar centrifugally operated valve means and radially oriented pistons, said radially oriented pistons having equal masses to simultaneously effect closure of said hydraulic passageway system.

* * * * *